US006839165B2

(12) United States Patent
Jacoby, Jr. et al.

(10) Patent No.: US 6,839,165 B2
(45) Date of Patent: Jan. 4, 2005

(54) DIMMER CONTROL SYSTEM HAVING REMOTE INFRARED TRANSMITTERS

(75) Inventors: Elliot G. Jacoby, Jr., Glenside, PA (US); Carl W. Gomes, II, Ocean, NJ (US); Jackson P. Gehman, Coopersburg, PA (US); Christopher J. Salvestrini, Bethlehem, PA (US); Richard D. Samuels, Riegelsville, PA (US); Shawn L. Leichliter, Allentown, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 0 days.

(21) Appl. No.: 10/210,679

(22) Filed: Aug. 1, 2002

(65) Prior Publication Data

US 2003/0025969 A1 Feb. 6, 2003

Related U.S. Application Data

(60) Provisional application No. 60/309,929, filed on Aug. 3, 2001.

(51) Int. Cl.[7] .................... G02B 13/14
(52) U.S. Cl. .................... 359/356; 250/221; 315/149
(58) Field of Search .................... 315/149–159, 315/312, 314, 316, 318, 324, 294; 359/355, 356, 362, 708, 709, 152; 250/221; 385/134

(56) References Cited

U.S. PATENT DOCUMENTS

| | | | | | |
|---|---|---|---|---|---|
| 5,248,919 | A | | 9/1993 | Hanna et al. | 315/291 |
| 5,637,863 | A | * | 6/1997 | Sanborn et al. | 250/221 |
| 5,909,087 | A | * | 6/1999 | Bryde et al. | 359/356 |
| 6,188,325 | B1 | * | 2/2001 | Vogel | 340/825.69 |
| 6,380,696 | B1 | | 4/2002 | Sembhi et al. | 315/294 |
| 6,484,316 | B1 | * | 11/2002 | Lindberg | 725/17 |
| 6,539,159 | B1 | * | 3/2003 | Upton | 385/134 |

* cited by examiner

*Primary Examiner*—Wilson Lee
(74) *Attorney, Agent, or Firm*—Drinker Biddle & Reath LLP

(57) ABSTRACT

A control system includes an electrical load control device responsive to radiant energy and a transmitter. The transmitter includes two sets of radiant energy generators connected to an electrical circuit such that polarity of the sets is reversed. A transmissive enclosure includes indented portions defining deflectors oriented obliquely with respect to a generator support surface. The transmitter is secured to a bracket for attachment to a backcover of the load control device. The control system may also include a master control generating an electrical control signal in response to an actuator or in response to a radiant energy signal. The control system is capable of limiting the master control to generate a signal only in response to the actuator. A power supply for the transmitter includes a filter network having a filter capacitor and resistor in series with a power supply capacitor and a diode in parallel with the resistor.

14 Claims, 10 Drawing Sheets

DIMMER CONTROL SYSTEM HAVING REMOTE INFRARED TRANSMITTERS

CROSS REFERENCE TO RELATED APPLICATION

This application claims priority from U.S. Provisional Application Ser. No. 60/309,929, filed Aug. 3, 2001, which is incorporated herein by reference in its entirety.

FIELD OF THE INVENTION

The present invention relates to dimmer control systems and more particularly to dimmer control systems in which a master control communicates with multiple dimmers.

BACKGROUND OF THE INVENTION

Dimmers have become increasingly popular for controlling light intensity. Dimmers typically employ solid-state devices such as triacs, silicon-controlled rectifiers, or field-effect transistors for varying the phase angle of an applied a.c. sinusoidal voltage. Known dimmers are responsive to command signals directed at the dimmer in the form of radiant energy, typically in the infrared range. Infrared transmissive windows or sections allow the command signal to reach an IR receiver housed within the dimmer.

IR responsive dimmers allow for dimmer control systems in which an IR command signal can be "blasted" from one source of IR radiation for receipt by multiple dimmers. An example of a dimmer control system that uses infrared radiation to communicate command signals from one source of IR to multiple dimmers is the SPACER SYSTEM™ sold by Lutron Electronics Co., Inc. of Coopersburg, Pa. The SPACER SYSTEM™ utilizes a master control having an optically clear back cover that allows command signals from a source of IR radiation located within the master control to be "blasted" outwardly from the master control into the wallbox that houses the master control. The system also includes multiple dimmers housed in the same wallbox. Each of the dimmers includes an optically clear back cover and an internal IR receiver. The IR receiver of each dimmer receives infrared command signals that are blasted into the wallbox from the master control. The system is also disclosed in U.S. patent application Ser. No. 09/220,632, issued as U.S. Pat. No. 6,380,696, assigned to Lutron Electronics Co., Inc., the Assignee of this application.

SUMMARY OF THE INVENTION

According to one aspect of the invention, there is provided a control system including at least one electrical load control device responsive to command signals in the form of radiant energy. The control system further includes a transmitter for producing command signals in the form of radiant energy for receipt by the at least one electrical load control device. The transmitter includes a pair of conductive terminals for receiving command signals in the form of electrical signals. The transmitter further includes two sets radiant energy generators each having a polarity for connection to an electrical circuit. The radiant energy generators are operably connected in an electrical circuit containing the conductive terminals such that the polarity of the generators of one of the sets is reversed with respect to the polarity of the generators of the other set. The radiant energy generators are further connected to the electrical circuit such that the sets are connected in parallel with one another.

According to another aspect of the invention, there is provided a control system including at least one electrical control device responsive to command signals in the form of radiant energy and a transmitter producing command signals in the form of radiant energy. The control system further includes a radiant energy deflector located between the transmitter and the at least one electrical load device for deflecting at least a portion of the radiant energy from the transmitter in a desired direction.

According to another aspect of the invention there is provided a control system including at least one electrical load control device responsive to command signals in the form of radiant energy and a transmitter, the transmitter capable of transmitting a command signal in the form of radiant energy in response to receipt of an electrical signal. The transmitter is connected to a master control by conductive wire, the master control producing electrical command signals for conveyance to the transmitter via the conductive wire. The master control includes at least one actuator accessible by a user of the master control for generation of an electrical command signal by the master control and a radiant energy receiver. The master control is capable of generating an electrical command signal in response to receipt of a radiant energy signal for relaying the signal to the transmitter. The control system is capable of preventing the master control from generating an electrical signal in response to receipt of a radiant energy signal such that the master control can only generate electrical signals in response to use of the at least one actuator.

According to another aspect of the invention there is provided a control system including a transmitter having at least one radiant energy generator for producing command signals in the form of radiant energy and at least one electrical load control device responsive to command signals in the form of radiant energy. The electrical load device is transmissive to the radiant energy of the transmitter and includes a cover portion. The control system further includes a bracket supporting the transmitter for attachment of the transmitter to the electrical load control device. The bracket engages the cover portion of the electrical load control device to position the at least one radiant energy generator with respect to the electrical load device.

According to another aspect of the invention there is provided a power supply for an infrared transmitter having at least one LED driver. The power supply includes a power supply capacitor and a filter network, the filter network including a filter capacitor and a resistor connected in series with the power supply capacitor. The power supply further includes a diode connected in parallel with the resistor of the filter network to provide isolation between the filter capacitor and the power supply capacitor.

DETAILED DESCRIPTION OF THE PREFERRED EMBODIMENTS

Figure 1:
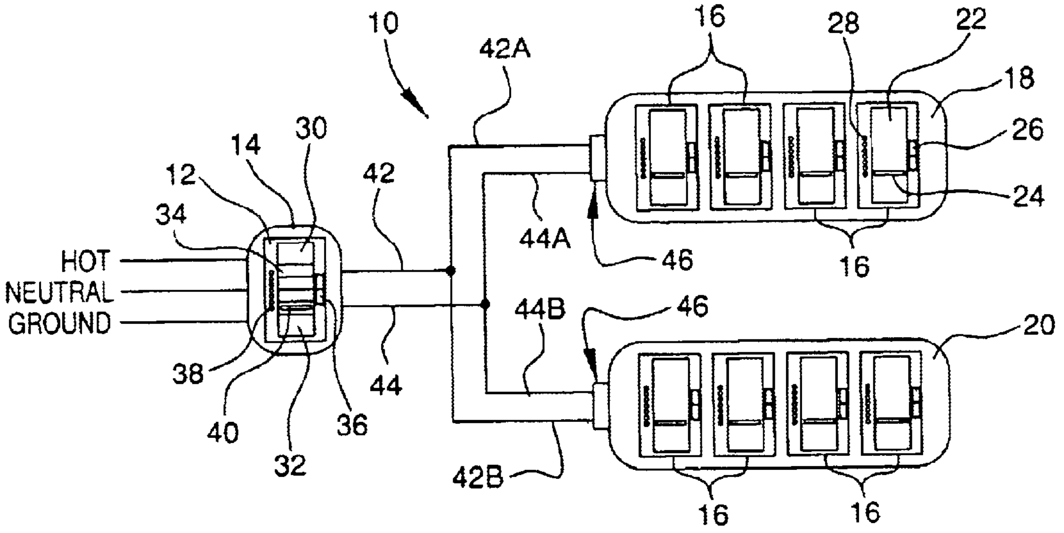
FIG. 1 is a schematic illustration of a dimmer control system according to the present invention.

Referring to the drawings, where like numerals identify like elements, there is shown a dimmer control system 10 according to the present invention. The control system 10 includes a master control 12 shown schematically in FIG. 1 located within a first wallbox 14. Hot and neutral wires connect the master control 12, in the well-known manner, to a power supply, such as the power distribution panel of a dwelling, for example.

The control system 10 also includes two sets of dimmers 16 located in separate second and third wallboxes 18 and 20, respectively. As shown in FIG. 1, the first wallbox 14 in which the master control 12 is located is separate from the second and third wallboxes 18 and 20 in which the dimmers 16 are located. Each of the dimmers 16 is capable of controlling the current supplied to an electrical load, such as a light, for example.

An example of a suitable master control 12 and suitable dimmers 16 for use in the control system of the present invention is described in U.S. patent application Ser. No. 09/220,632, issued as U.S. Pat. No. 6,380,696, which is hereby incorporated by reference. Features and operation of the dimmers are also described in U.S. Pat. Nos. 5,248,919 and 5,909,087, which are also hereby incorporated by reference. Each dimmer 16 includes a large actuator for a single non-latching switch. Within the border of the large actuator is an infrared receiving window 24 for receipt of infrared signals by an infrared receiver located behind window 24. Such signals may come from a hand held remote controller, for example. The dimmers 16 further include a user adjustable intensity actuator 26 for raising and lowering the light level of an attached load. An LED array 28 displays information including information about the light level of the attached load. The dimmers are capable of memory storage of preset light levels, associated with preferred lighting "scenes" for example. The dimmers are responsive to infrared command signals received by the IR receiver, to set the dimmers to the preset light levels stored by the dimmers for example.

The master control 12 includes an "ON" actuator 30, an "OFF" actuator 32, four preset actuators 34, an intensity actuator 36, LED indicators 38 and an IR receiving window 40 in one of the preset actuators 34. The master control includes a microprocessor (not shown) that performs various functions such as output of control signals to the dimmers 16 including setting of the dimmers to the preset light level stored in memory by the dimmers.

The dimmer control system 10 includes a pair of electrical conductors, referred to herein as traveler wires, 42 and 44 for carrying dimmer control signals from the master control 12 in the first wallbox 14 to the dimmers 16 located in the second and third wallboxes 18 and 20 as will be described in greater detail below. The traveler wires are preferably No. 14 AWG at a minimum. As seen in FIG. 1, each of the traveler wires 42, 44 splits into separate traveler wires 42A, 42B and 44A, 44B, respectively, for carrying control signals from the master control 12 to the separate sets of dimmers 16 in the second and third wallboxes 18, 20.

The control system 10 includes an infrared (IR) transmitter 46 for each of the wallboxes 18, 20 of the dimmers 16. Each of the IR transmitters 46 is connected to one pair of the traveler wires, either 42A, 44A or 42B, 44B, for receipt of dimmer control signals from the master control. Each of the IR transmitters 46, schematically shown in FIG. 1, is removably secured to the back cover of a dimmer 16 for locating the IR transmitter in the dimmer wallbox behind one of the dimmers, as will be described further hereinafter.

Referring to FIGS. 2–9, the construction and operation of the IR transmitter 46 associated with wallbox 18 is shown in greater detail. The IR transmitter 46 for wallbox 20 is similar in construction and operation to the IR transmitter shown in FIGS. 2–9. The transmitter 46 includes an optically clear enclosure 48 that is transmissive to both visible and IR light. A suitable material for forming the optically clear enclosure 48 is Lexan® resin number 241R available from General Electric.

Figure 2:
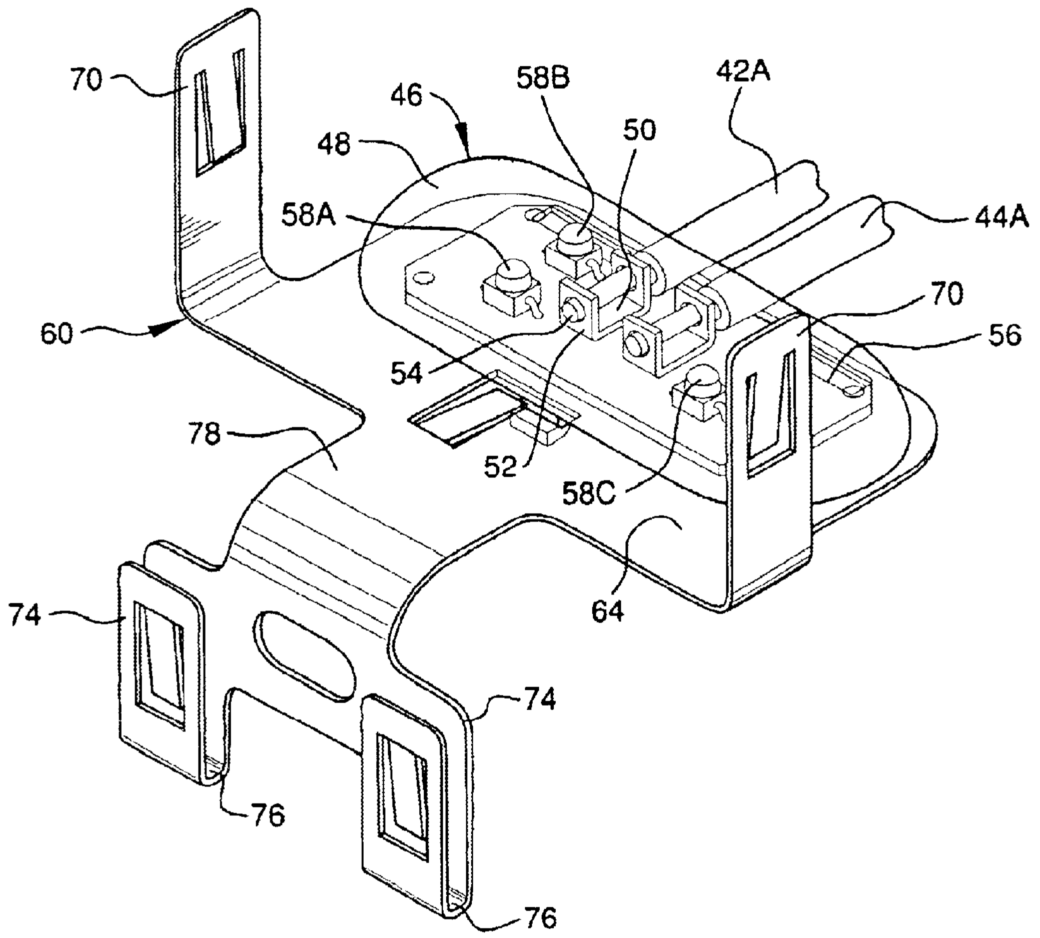
FIG. 2 is a perspective view of a remote infrared transmitter according to the present invention mounted to an attachment bracket.
Figure 3:
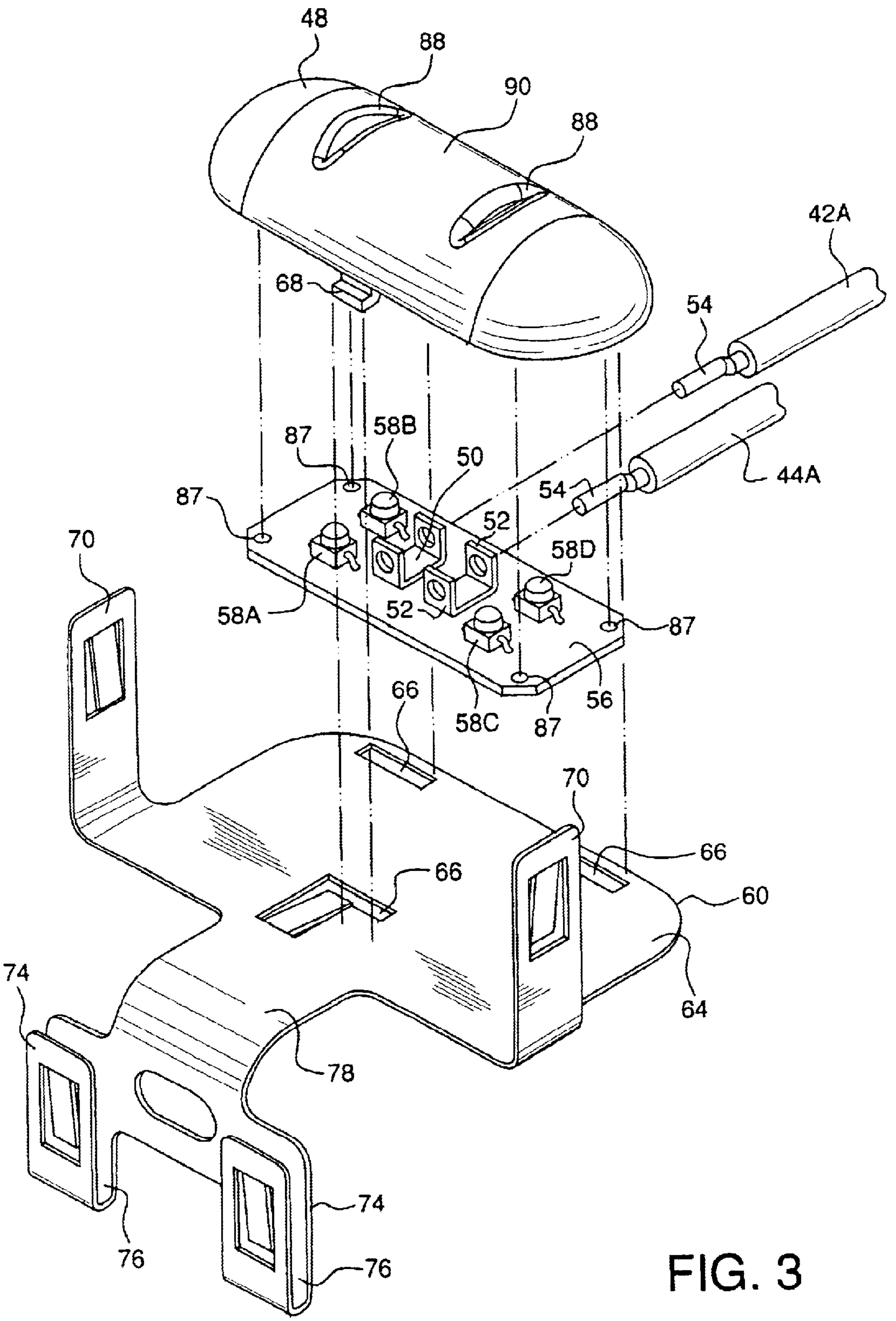
FIG. 3 is an exploded perspective view of the remote infrared transmitter and attachment bracket of FIG. 2.
Figure 10:
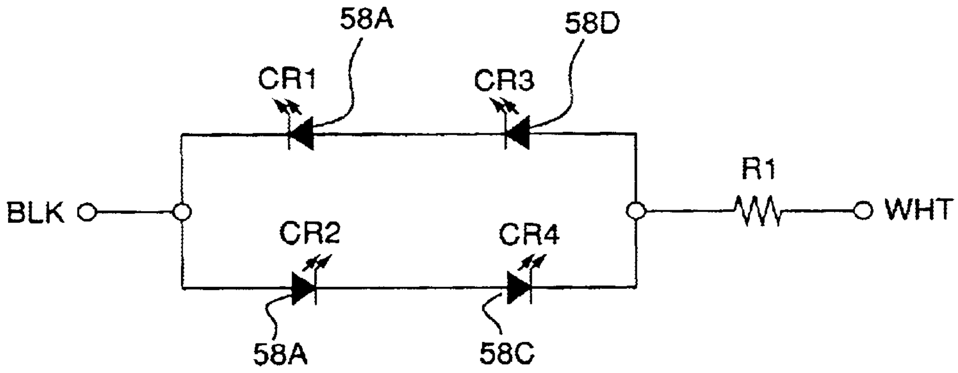
FIG. 10 is an electrical schematic for a remote infrared transmitter according to the present invention.

The IR transmitter 46 includes conductive terminals 50 each having a pair of upstanding legs 52 for receipt of conductive leads 54 of the traveler wires 42A and 44A that extend into the enclosure 48. The terminals 50 are supported on an upper surface of a printed wire board 56. The transmitter 46 includes four LEDs 58A–58D that provide the source of infrared radiation for blasting the IR command signals to the IR receivers through the IR transmissive enclosure 48. As seen in FIGS. 2 and 3, the LEDs 58A–58D are arranged such that LEDs 58A and 58B are located at an opposite end of the elongated enclosure 48 from LEDs 58C and 58D. Electrically, the LEDs are connected in anti-parallel fashion as shown in FIG. 10. This arrangement provides for a polarity insensitive wiring, to be described in greater detail hereinafter, in which one of the LEDs 58A–58D at each of the opposite ends of the elongated enclosure will blast IR signals regardless of which of the terminals 50 is used to connect the respective traveler wires 42A, 44A.

The IR transmitter 46 also includes an attachment bracket 60, preferably made of an electrically conductive material such as stainless steel, for securing the IR transmitter 46 to one of the dimmers 16. The attachment bracket secures the transmitter 46 to the dimmer 16 such that the transmitter is positioned adjacent to a back cover 62 of the dimmer 16. The back cover 62 is made from an optically clear material, such as the Lexan® resin material from which the transmitter enclosure 48 is made, to allow for passage of the IR signal blasted from transmitter 46 to an IR receiver enclosed by the back cover 62. It is preferable that the transmitter 46 be attached to a centrally located dimmer 16 of a dimmer set to facilitate transmission of the IR signal to each of the dimmers 16 of the set.

Figure 4:
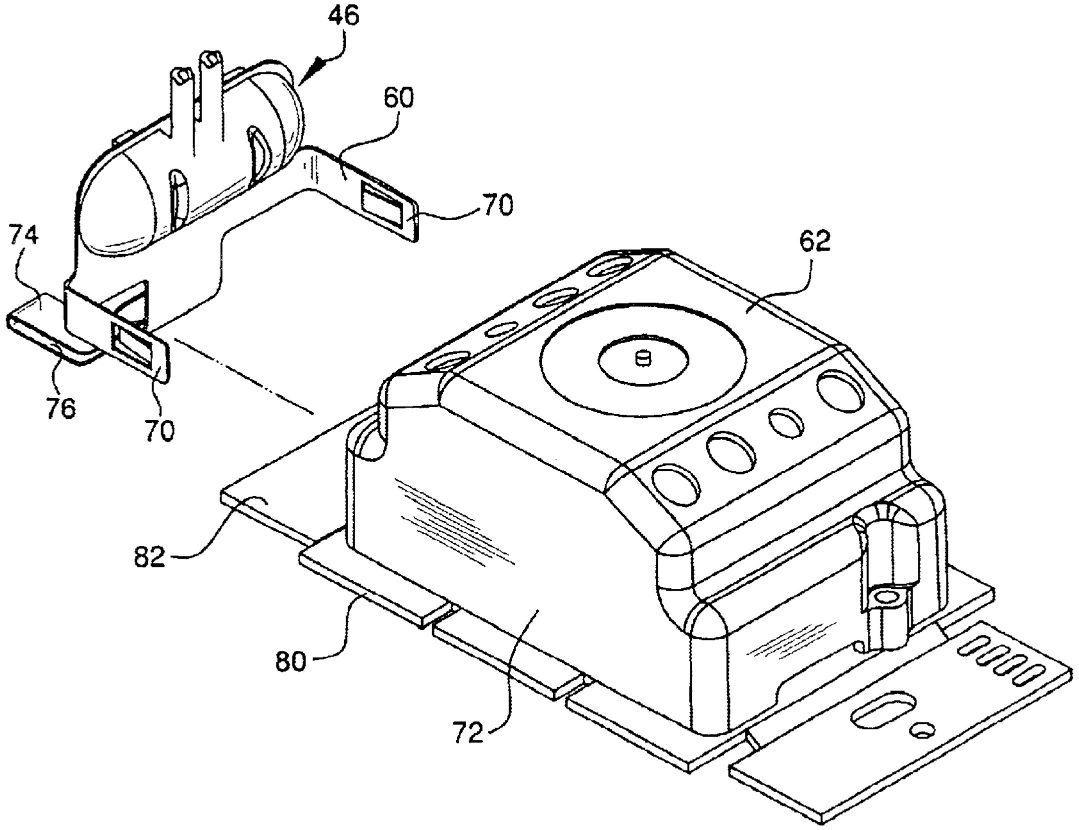
FIG. 4 is a perspective view of the remote infrared transmitter and attachment bracket of FIG. 2 adjacent a dimmer back cover.
Figure 5:
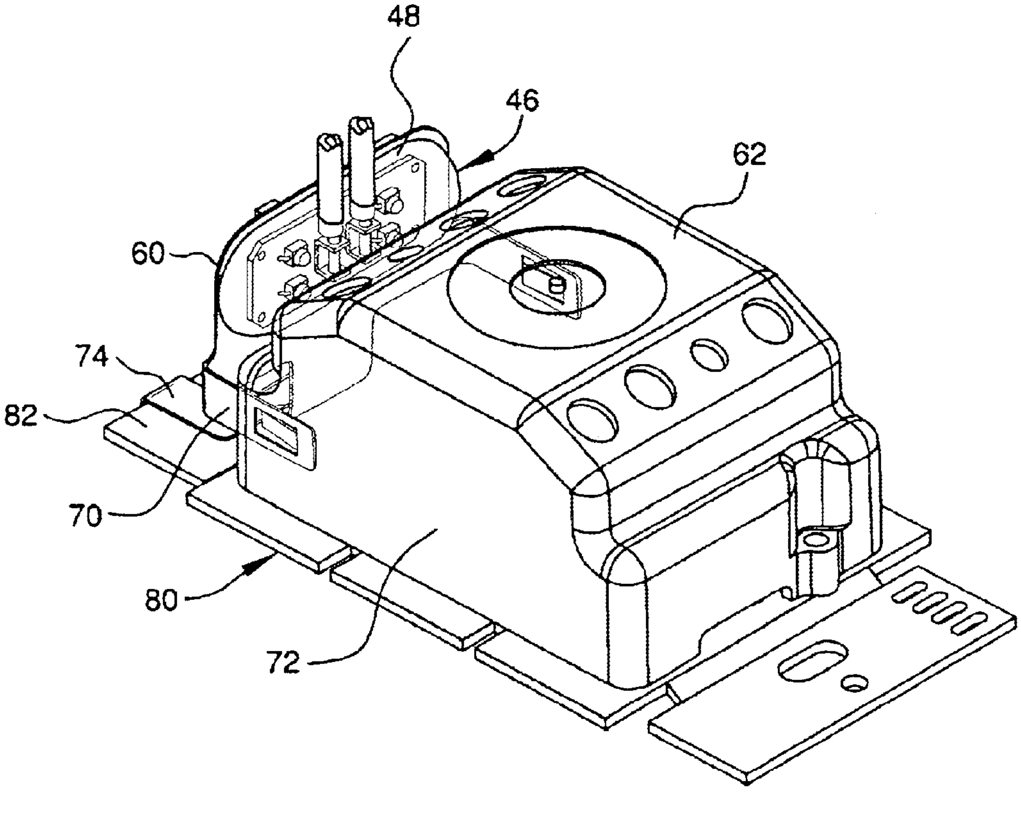
FIG. 5 is a perspective view of the remote infrared transmitter and attachment bracket of FIG. 2 engaged to a dimmer back cover.

The attachment bracket 60 includes a generally planar support portion 64 for supporting the printed wire board 56 and enclosure 48. The support portion includes slots 66 for receipt of tabs 68 of enclosure 48 for removably attaching of enclosure 48 to the attachment bracket 60. The attachment bracket 60 further includes positioning clips 70 extending generally perpendicularly to the plane of the support portion 64. As best seen in FIGS. 4 and 5, the clips 70 are received by sidewalls 72 of the dimmer back cover 62. The primary function of the positioning clips is to center the transmitter 46 with respect to the dimmer 16 as seen in FIG. 5.

The attachment bracket also includes mounting clips 74 that provide the primary means of attaching the transmitter 46 to the dimmer 16. The attachment bracket 60 further includes a second set of clips 74 having a U-shaped cross section forming a channel 76. The clips 74 extend from an extension 78 of the support portion 64 oppositely from clips 70. As best seen in FIG. 5, the clips 74 engage a yoke 80 of dimmer 16 such that an end portion 82 of the yoke is received in the channels 76 of clips 74. As seen in FIG. 5, the attachment and positioning of the transmitter 46 provided by clips 70 and 74 of attachment bracket 60 orients the enclosure 48 adjacent the back cover 62. This construction facilitates blasting of IR signals into the dimmer 16 through the back cover.

The use of an electrically conductive material for the attachment bracket 60 provides for use of the attachment bracket to ground the IR transmitter to the wallbox through the yoke 80. This construction eliminates the need for a separate grounding wire to make the grounding connection within the wallbox.

Figure 6A:
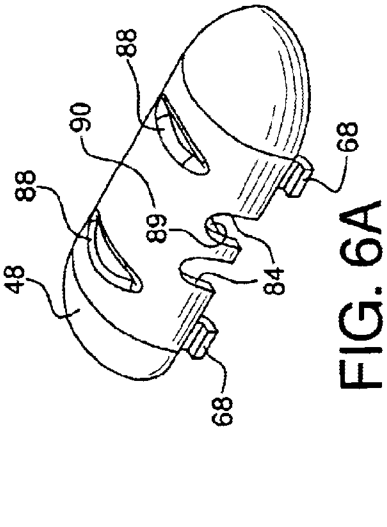
FIG. 6A is a perspective view of the enclosure of the remote infrared transmitter of FIG. 2.
Figure 6B:
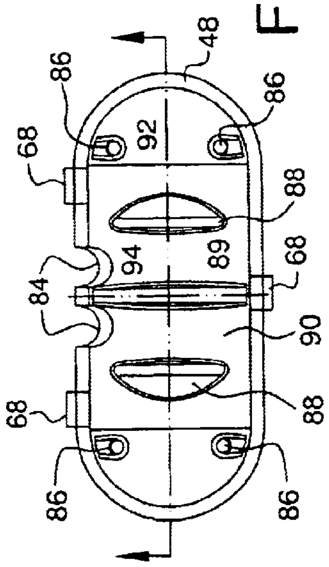
FIG. 6B is a bottom plan view of the enclosure of FIG. 6A.
Figure 6C:
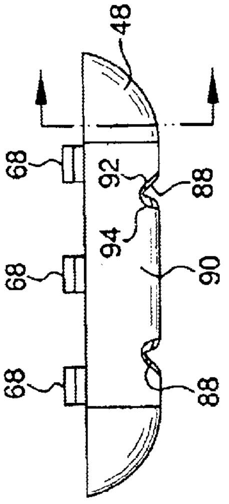
FIG. 6C is side elevational view of the enclosure of FIG. 6A.
Figure 6D:
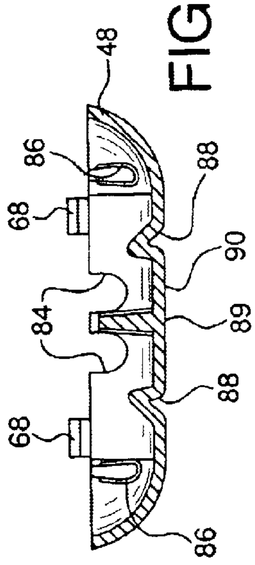
FIG. 6D is a sectional view of the enclosure of FIG. 6B taken along the lines A—A.
Figure 6F:
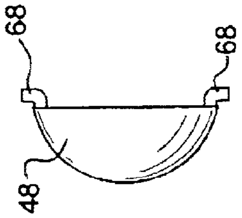
FIG. 6F is an end view of the enclosure of FIG. 6A.
Figure 6E:
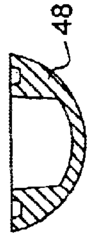
FIG. 6E is a sectional view of the enclosure of FIG. 6C taken along the lines B—B.

Referring to FIGS. 6A–F the construction of the enclosure 48 is shown in greater detail. As best seen in FIGS. 6A and 6D, the enclosure includes a pair of rounded notches 84 in one side to provide for passage of the traveler wires 42A, 44A through the enclosure 48. The location of the notches along the lower edge of the enclosure 48 provides for securement of the enclosure to the attachment bracket 60 with the conductive leads 54 engaging the legs of the terminals 50. The enclosure 48 also includes posts 86 that, as best seen in FIG. 6D, extend downwardly from the enclosure. The posts engage locating holes 87 that are provided in the printed wire board 56 (best seen in FIG. 3).

The posts 86 serve two primary functions. They serve to temporarily locate the printed wire board 56 within the enclosure 48 while the enclosure 48 is being snapped into position on the attachment bracket 60. The posts 86 also serve to prevent the LEDs 58A–58D mounted on the printed wire board 56 from striking the enclosure 48. As seen in FIG. 6D, the enclosure includes shoulder portions surrounding each of the posts 86 that serve to maintain separation between the LEDs 58A–58D and the upper portion of enclosure 48.

The enclosure 48 further includes a central rib 89 extending transversely across the enclosure. The central rib 89, acting in conjunction with the shoulder portions of the posts 86, serves to pin the printed wire board 56 between the enclosure 48 and the attachment bracket 60 when the tabs 68 engage the slots 66. This prevents the printed wire board 56 from floating within the enclosure 48. The central rib 89 also acts in conjunction with the shoulder portions of the posts 86 to prevent the LEDs 58A–58D from striking the enclosure 48. The transversely extending central rib 89 further serves to bisect the enclosure 48 thereby providing for additional electrical isolation between the leads 54 of traveler wires 42A, 44A.

Figure 7:
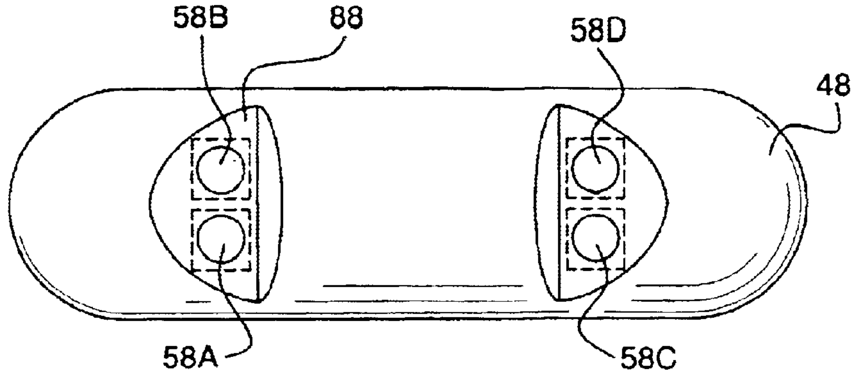
FIG. 7 is a top view of the enclosure and LEDs of a remote infrared transmitter according to the present invention.
Figure 8:
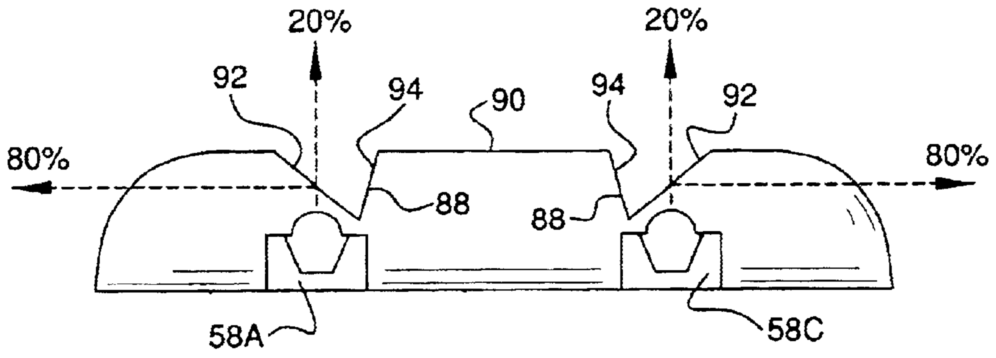
FIG. 8 is a side view of the enclosure and LEDs of FIG. 7.

As best seen in FIGS. 6A–6D and in FIGS. 7 and 8, the enclosure 48 includes a pair of indented portions 88 extending inwardly from an upper portion 90 of the enclosure. Each of the indented portions includes generally planar first and second legs 92 and 94, respectively. As best seen in FIG. 8, the angle of the first leg 92 with respect to the upper portion 90 is less than the angle of the second leg 94 such that the first leg 92 is longer than the second leg 94. The indented portions 88 are located on the enclosure 48 such that when the enclosure is secured to the printed wire board 56, the LEDs 58A–58D are located below the first leg 92. This is best seen in FIGS. 7 and 8.

Figure 9:
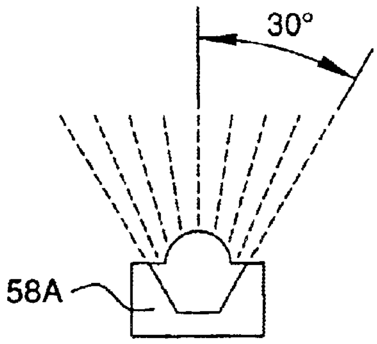
FIG. 9 is side view of one of the LEDs of FIGS. 7 and 8 having notations thereon.

The inclusion of the indented portions 88 of enclosure 48 serves to direct the IR radiation blasted from the LEDs 58A–58D. The direction of the IR emitted from the transmitter 46 is further enhanced by the construction of the LEDs 58A–58D. As illustrated in FIG. 9, in which LED 58A is shown, the LEDs are constructed to emit an upwardly directed cone of IR radiation with respect to the plane of the printed wire board 56, having a half-angle of 30 degrees. As the cone of IR light strikes the first leg 92 of the indented portion 88, the majority of the IR light, approximately 80 percent, is reflected parallel to the plane of the printed wire board 56 through one of the opposite ends of the elongated enclosure 48. A minority of the IR light, approximately 20 percent, passes vertically through the first leg 92. Directing the IR radiation in this manner facilitates blasting the IR signal into outwardly located dimmers 16 when the IR transmitter is secured to a centrally located dimmer of a set of dimmers.

Turning to FIG. 10, a wiring schematic is shown for LEDs 58A–58D. As may be seen, the diodes are arranged in two sets of diodes that are connected in parallel with one another. LEDs 58A and 58C form the first set and LEDs 58B and 58D form the second set. The LEDs are connected in the electrical circuit such that the polarity of the LEDs of the first set is reversed from the polarity of the second set. This "anti-parallel" connection of the two sets of LEDs ensures that one of the sets will operate to generate infrared signals regardless of which of the terminals 50 the respective traveler wires 42A and 44A are connected to. In this manner, the connection of traveler wires is rendered polarity insensitive such that IR signals will be directed out of the opposite ends of the elongated enclosure regardless of the connection chosen.

Figure 11:
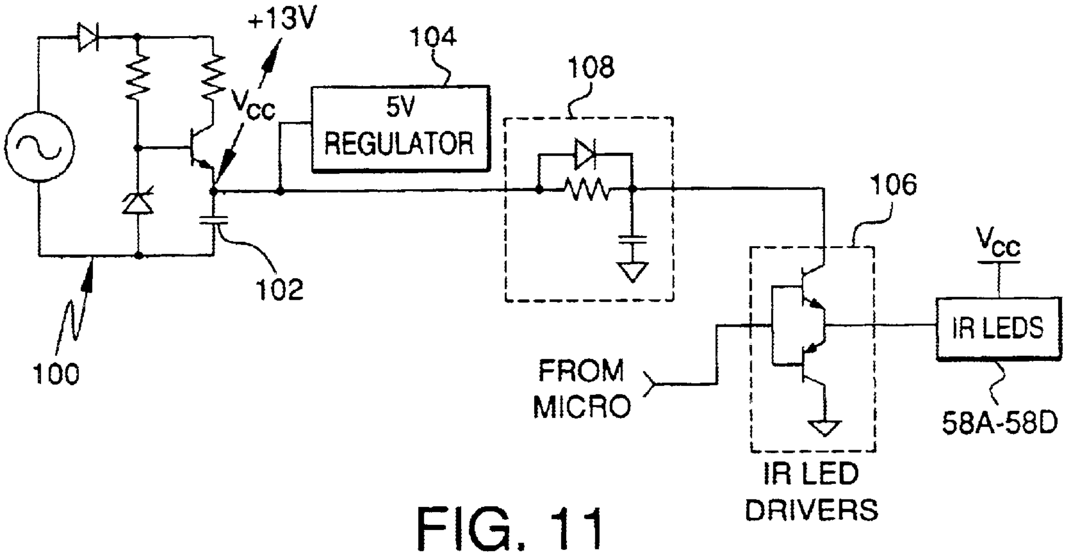
FIG. 11 is an electrical schematic of a power supply circuit for a remote infrared transmitter according to the present invention.
Figure 12:
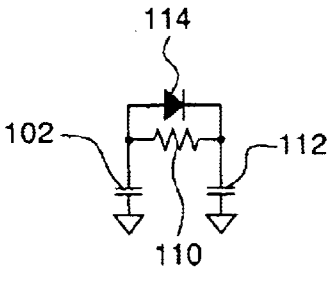
FIG. 12 is a simplified schematic representation of the circuit of FIG. 11.
Figure 13:
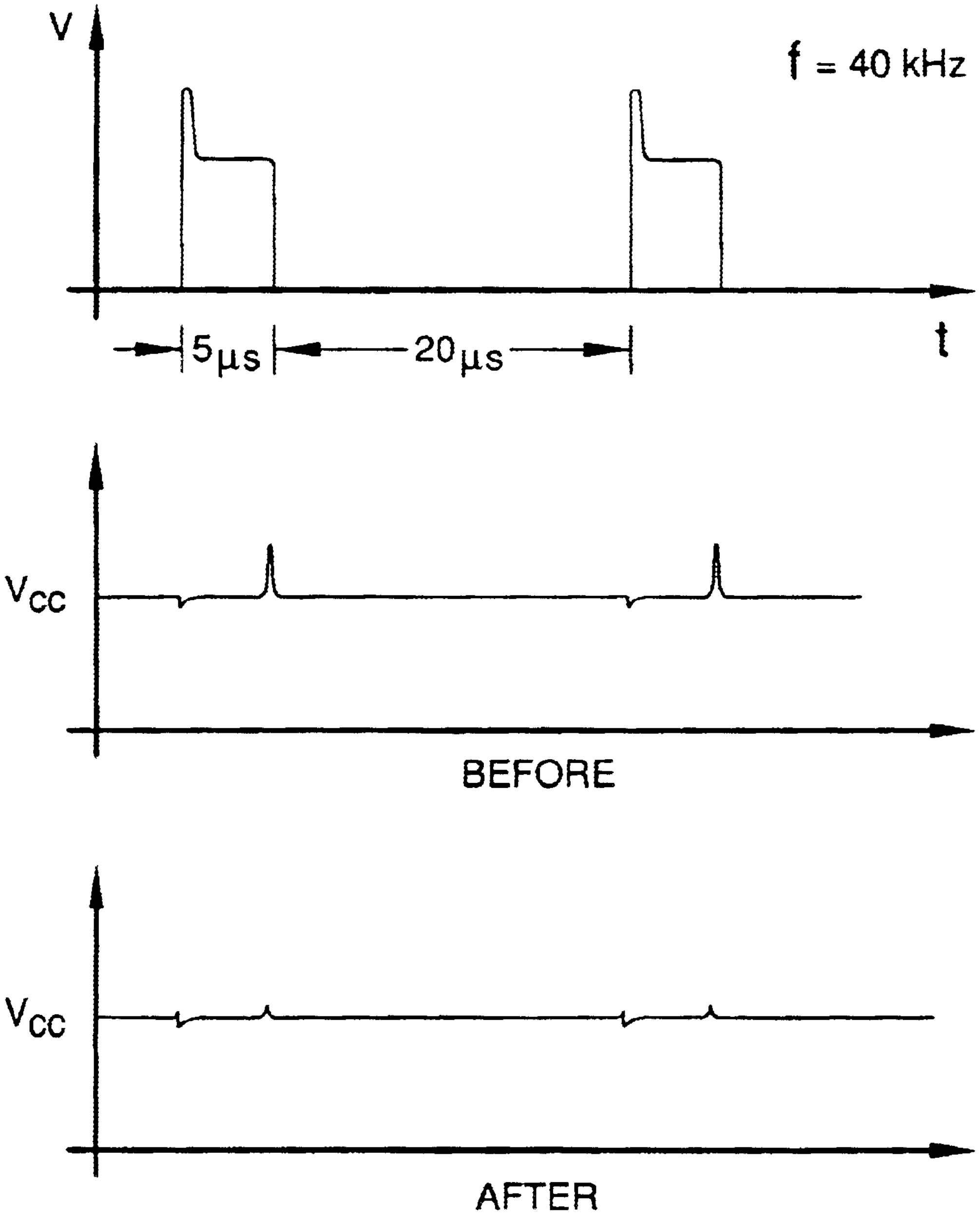
FIG. 13 is a graphical illustration of power supply waveforms.

Referring to FIGS. 11–13, the present invention provides for an improved power supply system for the IR transmitters. As seen in FIG. 11, the power supply for the master control system 10 includes a power supply circuit 100 that includes a power supply capacitor 102. The traveler wires 42, 44 that extend from the master control 12 will typically be at 120 volts with respect to ground. As shown in FIG. 11, the voltage required to drive the LEDs 58A–58D of transmitter 46 will be provided by a separate 13-volt supply. This 13-volt supply is used to power the IR LEDs 58A–58D, drive a 5-volt regulator 104 and supply current pulses that operate drivers 106 for the LEDs.

The present invention provides an improved filter 108, shown enclosed by dotted lines in FIG. 11, for running the LED drivers 106. Referring to FIG. 12, a filtering resistor 110 and capacitor 112 are included in the filter 108. The use of a resistor/capacitor (R-C) network is the conventional manner of running noisy circuitry such as the LED drivers from a main power supply capacitor such as capacitor 102. However, an R-C network alone would fail to protect the main power supply capacitor against sharp current spikes caused by the operation of the LED drivers. The lack of isolation between the two capacitors provided by an R-C network would result in charge being pulled from the main power supply capacitor as well as the filter capacitor. As a result, the performance of the main power supply could be degraded.

The improved filter 108 of the present invention includes a diode 114 which serves to limit the amount of current that can be drawn by the LED drivers 106 directly from the main supply capacitor 102. The diode 114 is placed in parallel with the resistor 110. The inclusion of the diode has no effect on the filtering performance of the R-C network. Referring to FIG. 13, the graphs illustrate the effect that the addition of the diode has on the power supply line. The inclusion of the diode 114 serves to limit the amount of charge that may be drawn from the main supply capacitor 102. As shown in FIG. 13, the inclusion of the diode 114 serves to reduce the voltage spikes that would otherwise appear on the power supply line.

Figure 14:
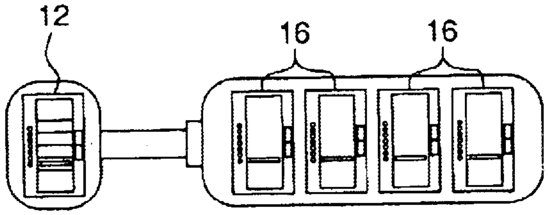
FIG. 14 is a schematic illustration of a dimmer control system according to the present invention set for operation in a first mode.
Figure 15:
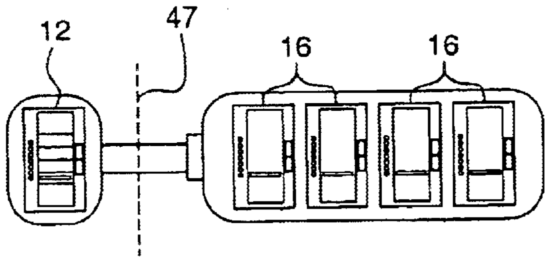
FIG. 15 is a schematic illustration of the dimmer control system of FIG. 14 set for operation in a second mode.

Referring now to the schematic illustrations of FIGS. 14 and 15, the dimmer control system 10 of the present invention provides for toggling of the control system 10 between two modes of operation. Each of the dimmers 16 is capable of receiving IR signals through the IR window 24 from in front of the dimmer. Each of the dimmers 16 is also capable of receiving IR signals through the back cover 26 in the wallbox behind the dimmer. This creates the possibility of "collisions" between IR signals received by the dimmer both from direct reception of an infrared signal through window 24 (from a handheld remote control, for example) as well as from indirect reception of the signal if the same signal is received by the master control 12 and relayed to the dimmers 16 by the IR transmitter 46.

Referring to FIG. 14 there is shown a first mode, or "room" mode of operation. The "room" mode of operation is useful for situations where collisions between a direct IR signal and an indirect relayed IR signal are possible. Such a situation might occur, for example, where the wallboxes containing the master control 12 and the dimmers 16 are located in the same room. In the room mode, the master control 12 is disabled from relaying an IR signal that is received by the master control 12, from a handheld remote control for example. Although the master control 12 is prevented from relaying a received IR signal, the master control remains enabled to transmit IR signals to the dimmers 16 directly in response to use of the actuators of master control 12 shown in FIG. 1.

Referring to FIG. 15, the second or "closet" mode of operation is shown. This mode of operation is useful where the possibility of a collision between a direct IR signal and an indirect retransmitted IR signal is limited. This would occur, for example, where a physical barrier 48 such as a wall, is located between the wallbox of the master control 12 and the wallbox of the dimmers 16. When set to the "closet" mode, the master control is enabled to send IR command signals to the dimmers 16 through the transmitters 46 either in response to use of the actuators of the master control 12 or in response to an IR signal that is received by the master control.

What is claimed is:

1. A control system comprising:

at least one electrical load control device responsive to command signals in the form of radiant energy; and a transmitter for producing command signals in the form of radiant energy for receipt by the at least one electrical load control device, the transmitter comprising a pair of conductive terminals for receipt of command signals in the form of electrical signals, the transmitter further comprising two sets radiant energy generators each having a polarity for connection to an electrical circuit, the radiant energy generators operably connected in an electrical circuit containing the conductive terminals, the generators connected to the electrical circuit such that the polarity of the generators of one of the sets is reversed with respect to the polarity of the generators of the other set, the radiant energy generators further connected to the electrical circuit such that the sets are connected in parallel with one another.

2. The control system according to claim 1, wherein each of the radiant energy generators generates infrared energy and wherein the transmitter includes an infrared transmissive enclosure adapted to enclose the infrared generators.

3. The control system according to claim 2, wherein the infrared generators are LEDs mounted on a support defining a substantially planar surface and wherein the enclosure includes a pair of oppositely located indented portions, each of the indented portions located on the enclosure such that at least one LED is positioned adjacent each of the indented portions.

4. The control system according to claim 3, wherein each indented portion defines a substantially planar deflector portion, the deflector portion oriented at an oblique angle with respect to the LED support surface.

5. The control system according to claim 4, wherein each of the LEDs is adapted to emit a cone of IR radiation directed towards the respective deflector portion of the enclosure, and wherein the deflector portion is oriented with respect to the LED support surface such that a majority of the infrared energy from the cone of IR radiation is reflected in a direction that is substantially parallel to the LED support surface.

6. The control system according to claim 1, wherein the at least one electrical load control device is a dimmer having an infrared transmissive backcover and wherein the transmitter is mounted on an attachment bracket, the attachment bracket having a first set of clips each adapted for engagement with a sidewall of the dimmer backcover.

7. The control system according to claim 1, wherein the attachment bracket includes a second set of clips adapted for engagement with a yoke to which the dimmer backcover is secured, the attachment bracket being electrically conductive to facilitate a grounded connection for the transmitter through the yoke.

8. A control system comprising:

at least one electrical load control device responsive to command signals in the form of radiant energy;

a transmitter for transmitting a command signal in the form of radiant energy in response to receipt of an electrical signal;

electrically conductive wire connected to the transmitter; and a master control connected to the conductive wire opposite the transmitter, the master control producing electrical command signals for conveyance to the transmitter via the conductive wire, the master control comprising at least one actuator accessible by a user of the master control for generation of an electrical command signal by the master control, the master control further comprising a radiant energy receiver, the master control capable of generating an electrical command signal in response to receipt of a radiant energy signal for relaying the signal to the transmitter, the control system capable of preventing the master control from generating an electrical signal in response to receipt of a radiant energy signal such that the master control only generates electrical signals in response to use of the at least one actuator.

9. The control system according to claim 8, wherein the transmitter includes a plurality of LEDs for generating infrared energy.

10. The control system according to claim 8, wherein the at least one load control device is a dimmer having a backcover and wherein the transmitter is secured to the dimmer backcover.

11. The control system according to claim 10, wherein the at least one load control device includes a plurality of dimmers located in a wallbox and wherein the transmitter is secured to a centrally located one of the dimmers with respect to the plurality of dimmers.

12. A control system comprising:

a transmitter having at least one radiant energy generator for producing command signals in the form of radiant energy;

at least one electrical load control device responsive to command signals in the form of radiant energy, the electrical load device comprising a cover portion transmissive to the radiant energy generated by the transmitter;

a bracket supporting the transmitter for attachment of the transmitter to the electrical load control device, the bracket engaging the cover portion of the electrical load control device to position the at least one radiant energy generator with respect to the electrical load device.

13. The control system according to claim 12, wherein the at least one electrical load control device is a dimmer having a backcover transmissive to the radiant energy generated by the transmitter, and wherein the bracket includes a first set of clips each adapted to engage a sidewall of the backcover.

14. The control system according to claim 13, wherein backcover of the dimmer is secured to a yoke and wherein the bracket includes a second set of clips adapted to engage the yoke, the bracket being electrically conductive to provide for a grounded connection of the transmitter through the yoke.

* * * * *